(12) United States Patent  
Jensen et al.

(10) Patent No.: US 8,724,894 B1  
(45) Date of Patent: May 13, 2014

(54) COLORIZATION OF DIGITAL IMAGERY

(71) Applicants: David W. Jensen, Marion, IA (US);  
Luke R. Pierce, Carbondale, IL (US);  
John S. Alexander, Ely, IA (US)

(72) Inventors: David W. Jensen, Marion, IA (US);  
Luke R. Pierce, Carbondale, IL (US);  
John S. Alexander, Ely, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 13/692,368

(22) Filed: Dec. 3, 2012

(51) Int. Cl.  
*G06K 9/00* (2006.01)

(52) U.S. Cl.  
USPC ............................ 382/162; 358/529

(58) Field of Classification Search  
USPC ............... 382/162, 163; 358/1.9, 523, 529  
See application file for complete search history.

(56) References Cited

U.S. PATENT DOCUMENTS 6,917,445 B2 * 7/2005 Kuno et al. ............... 358/1.9  
7,190,486 B2 * 3/2007 Tabata et al. ............. 358/1.9

* cited by examiner

*Primary Examiner* — Duy M Dang  
(74) *Attorney, Agent, or Firm* — Donna P. Suchy; Daniel M. Barbieri

(57) ABSTRACT

A method for colorizing a monochrome image is provided. The method includes the step of transforming the monochrome image to a luminance color domain and also transforming a color sample corresponding to the monochrome image to the luminance color domain. The method also includes the step of mapping the transformed color sample on to the transformed monochrome image and merging the transformed color sample with a lightness channel of the transformed monochrome image to yield a final image. A further step of the method involves transforming the final image to a color space.

20 Claims, 4 Drawing Sheets

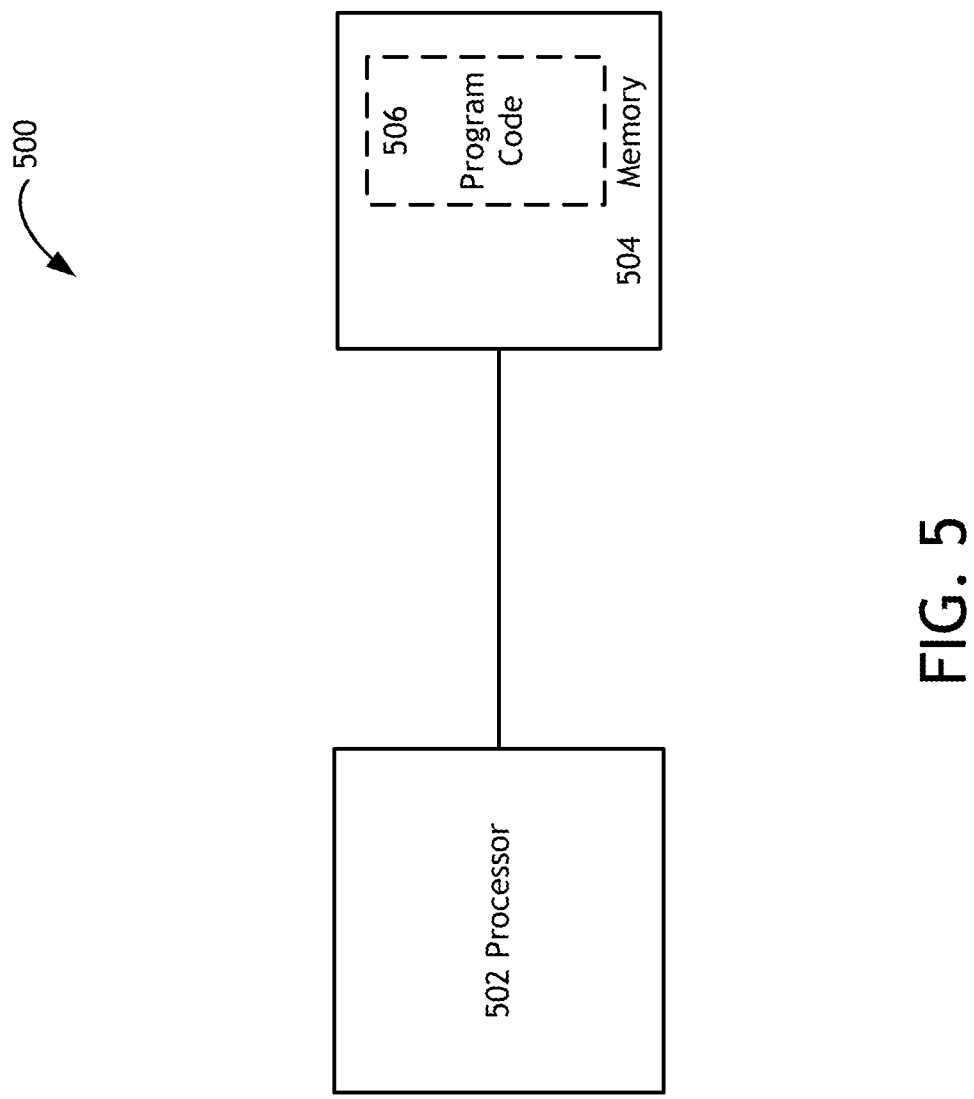

COLORIZATION OF DIGITAL IMAGERY

TECHNICAL FIELD

The present disclosure generally relates to the field of digital imagery, and more particularly to a system and method for colorizing digital imagery.

BACKGROUND

Image colorization is a technique often used in graphical design, medical imagery, and soldier vision systems to apply color to a monochrome image. Image colorization may involve using a small number of color samples to reconstruct a high resolution color image. Previous colorization techniques may create desaturated, blurry, or falsely colored images.

Therefore, there exists a need for improved systems and methods for colorizing images.

SUMMARY

The present disclosure is directed to a method for colorizing a monochrome image. The method includes the step of transforming the monochrome image to a luminance color domain and also transforming a color sample corresponding to the monochrome image to the luminance color domain. The method also includes the step of mapping the transformed color sample on to the transformed monochrome image and merging the transformed color sample with a lightness channel of the transformed monochrome image to yield a final image. A further step of the method involves transforming the final image to an appropriate color space. Using the method, it may be possible to colorize monochrome images using a small number of color samples to produce a high resolution color image.

The present disclosure is also directed to a method for colorizing a sparse color filter image. The method may include the step of mapping a color sample of the sparse color filter image with a panchromatic sample of the sparse color filter image to yield a mapped image. The method also includes the step of merging the mapped image with a lightness channel of the sparse color filter image to yield a colorized output. A further step of the method involves applying a discrete wavelet transform to the colorized output to determine whether a false color region is present. The method also includes the step of correcting the false color region when at least one false color region is present.

The present disclosure is also directed to a system for colorizing a monochrome image. The system may include a processor in communication with a memory. The system may also include a computer executable program code stored on the memory. The computer executable program code may be configured to execute on the processor. The computer executable program code transforms the monochrome image and a color sample corresponding to the monochrome image to a luminance color domain and maps the transformed color sample on to the transformed monochrome image. The computer executable program code also merges the transformed color sample with a lightness channel of the transformed monochrome image to yield a final image. The computer executable program code also transforms the final image to a color space.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIG. 5 is a block diagram of a system for colorizing a monochrome image.

DETAILED DESCRIPTION

Figure 1:
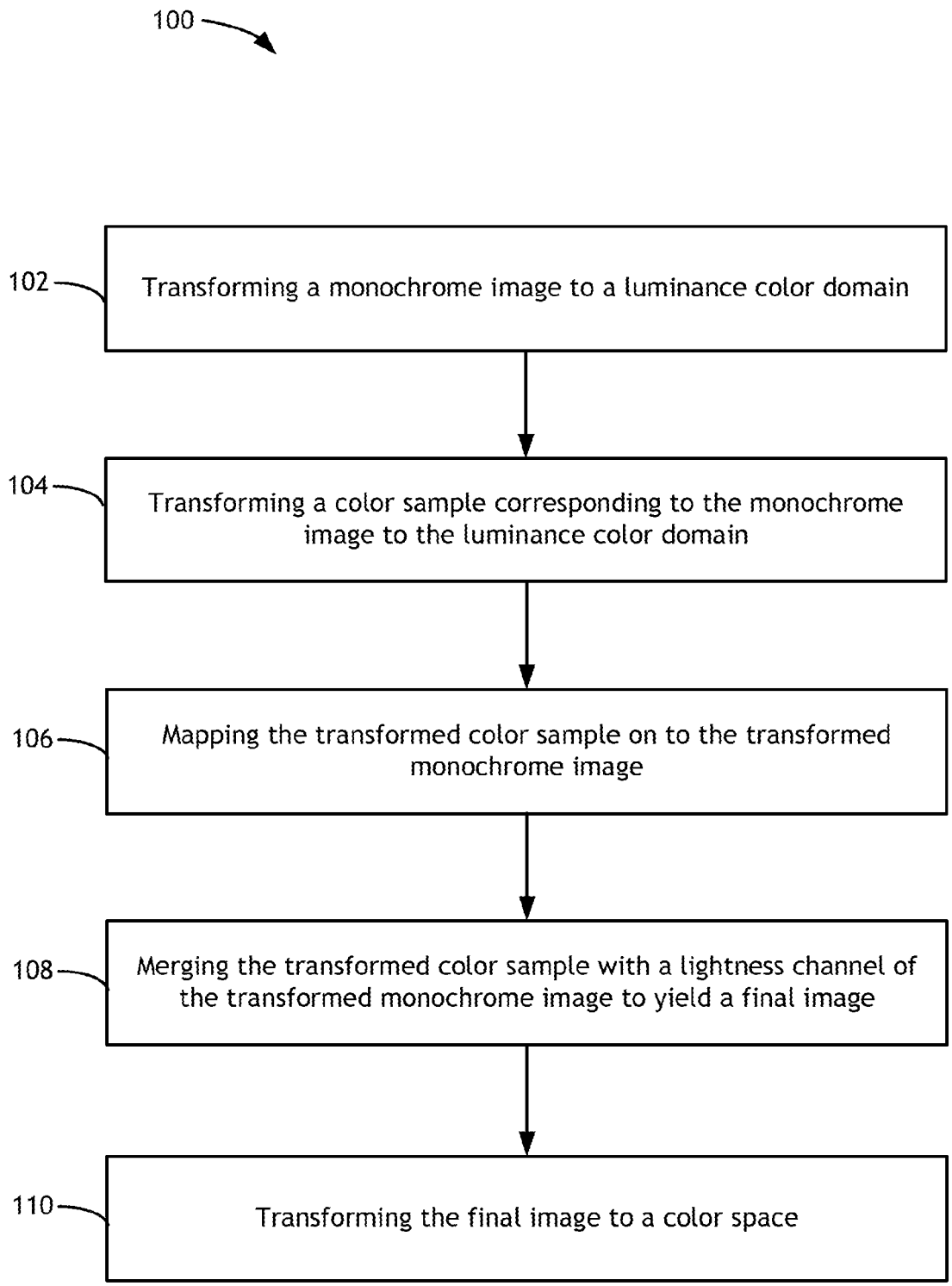
FIG. 1 is a flow diagram of a method for colorizing a monochrome image.

Reference will now be made in detail to the subject matter disclosed, which is illustrated in the accompanying drawings. Referring generally to FIG. 1, a method 100 for colorizing a monochrome image is provided. The method 100 includes the step of transforming the monochrome image to a luminance color domain 102 and also transforming a color sample corresponding to the monochrome image to the luminance color domain 104. The method 100 also includes the step of mapping the transformed color sample on to the transformed monochrome image 106 and merging the transformed color sample with a lightness channel of the transformed monochrome image to yield a final image 108. A further step of the method 100 involves transforming the final image to a color space 110. Using the method 100, it may be possible to colorize monochrome images using a small number of color samples to produce a high resolution color image.

The steps of transforming the monochrome image to a luminance color domain 102 and transforming a color sample corresponding to the monochrome image to the luminance color domain 104 of the method 100 may include transforming the monochrome image and color sample to a CIELAB color space domain or a YUV color space domain. In one embodiment, the monochrome image and the color sample may occupy an RGB color space. Transforming the monochrome image and the color sample from the RGB color space to the YUV color space domain or the CIELAB color space domain may be completed using standard matrices and equations known in the art. For monochrome pixels in the RGB color space the luminance, L of the CIELAB color domain, can be derived from any one of the red, green, or blue color channels because they have identical values.

The method 100 shown in FIG. 1 also includes the step of mapping the transformed color sample on to the transformed monochrome image 106. Mapping the transformed color sample on to the transformed monochrome may be performed using a nearest neighbor technique. The mapping may also be performed through interpolation based on a neighboring sample. The interpolation technique may be useful if a pixel of the monochrome image does not have a direct mapping by allowing a neighboring sample with a more direct mapping to be used to interpolate the value.

In one embodiment, the step of mapping the transformed color sample on to the transformed monochrome image 106 of the method 100 shown in FIG. 1 may be performed using the following equation:

$$M_{x,y}^{RGB} = C_{\left[x\frac{C_w}{M_w}\right],\left[y\frac{C_h}{M_h}\right]}$$

where C represents a pixel from the transformed color sample, M represents the monochrome image, $C_w$ is a width of the transformed color sample, $M_w$ is a width of the transformed monochrome image, $C_h$ is a height of the transformed color sample, and $M_h$ is a height of the transformed monochrome image. The transformed color sample may be transformed as a two dimensional space where y corresponds to the vertical axis and x corresponds to the horizontal axis. A pixel of M may be considered to be directly mapped when:

$$x\frac{C_w}{M_w} \in \mathbb{Z} \text{ and } y\frac{C_h}{M_h} \in \mathbb{Z}.$$

The step of mapping the transformed color sample on to the transformed monochrome image 106 of the method 100 may also include the step of detecting a value of a pixel of the transformed color sample and comparing this value to a predetermined threshold. If the pixel is greater than or equal to the predetermined threshold, then the pixel may be mapped on to the transformed monochrome image. If the pixel is less than the predetermined threshold, then the pixel is not mapped on to the monochrome image and the monochrome result may be used in these regions. The step of thresholding the value of the pixels of the transformed color sample may help to improve the quality of the ultimate colorized image. For example, if the color sample is derived from a low-light environment, the sensor data associated with the color sample may contain very small values. Transforming these small color sample values to the luminance color domain may cause large movements in the luminance color space and produce unusual color transitions and anomalies in the final colorized image. It may be possible to mitigate these results through the thresholding step by defaulting to the monochrome result in the low value regions instead of mapping the low value color sample.

The method 100 shown in FIG. 1 may also include the step of merging the transformed color sample with a lightness channel of the transformed monochrome image to yield a final image 108. This step may involve merging an alpha channel and a beta channel of the transformed color sample with a lightness channel of the transformed monochrome image if the transformed color sample and transformed monochrome image are in the CIELAB color domain. If the transformed color sample and transformed monochrome image are in the YUV color domain, then the step of merging the transformed color sample with a lightness channel of the transformed monochrome image may include merging a U and V chrominance component with a with a lightness channel of the transformed monochrome image.

The method 100 shown in FIG. 1 may also include the step of transforming the final image to a color space 110. In one example, this step may involve transforming the final image from a luminance color domain such as YUV or CIELAB color space to the RGB color space. The color space may also include CIELAB, YUV, CIE (International Commission on Illumination), RGB, luminance plus chrominance, hue and saturation, and CMYK (cyan, magenta, yellow, and key) color space. These transformations may be completed using standard matrices and equations known in the art.

The method 100 shown in FIG. 1 may require a single image traversal which executes in linear time, O(n), where n is the number of pixels. The single image traversal and linear time may help make the method 100 scalable for larger resolution images. In addition, it may be possible to determine the execution time of the method 100, which may make the method 100 compatible with real-time systems.

The monochrome image and the color sample corresponding to the monochrome image of the method 100 shown in FIG. 1 may be taken at the same time or at different times and on the same camera or imaging system or different systems. For example, the color sample and the monochrome image may be produced from a single camera, a plurality of cameras, a video camera, a sparse color filter camera, a magnetic resonance imaging system, a radar imaging system, a sonar imaging system, a combination of the cameras and systems listed, or any other photographic or other imaging system known in the art.

The monochrome image and the color sample corresponding to the monochrome image of the method 100 shown in FIG. 1 may come from a multiple camera system. In one embodiment, the monochrome image may come from a high-resolution low-light visible-light monochrome camera and the color sample may come from a low-resolution long-exposure color camera. In another embodiment, the monochrome image may come from a camera detecting non-visible spectrums (e.g. long wave infra-red, short wave infra-red, ultra violet) and the color sample may come from a low-resolution long-exposure color camera.

The monochrome image and the color sample corresponding to the monochrome image of the method 100 shown in FIG. 1 may also come from a single camera system. For example, the monochrome image and the color sample may come from a single camera with non-filtered and color filtered pixels. This could include a RGBI-Bayer filter (RGB) camera with a panchromatic (unfiltered) pixel.

The monochrome image and the color sample corresponding to the monochrome image of the method 100 shown in FIG. 1 may also come from a sparse color filter camera. For example, the sparse color filter camera may use RGB in a larger grid of unfiltered pixels (for example, a 4×4 grid, an 8×8 grid, a 16×16 grid). The sparse color filter camera may also use two color filtered pixels (e.g. RG, GB, RB) in a larger grid of unfiltered pixels (a 4×4 grid, an 8×8 grid, a 16×16 grid). The sparse color filter may also use non-primary color filtered pixels such as yellow and magenta pixels.

In another embodiment, either the color sample or the monochrome image or both may also be an individual image or separate frames of a video stream.

In one embodiment, the color sample of the method 100 shown in FIG. 1 may include a color sample of color pixels representing a scaled down version of the full scale monochrome image. For example, the color sample may contain only a fraction of the information that is contained in the full scale monochrome image.

Figure 2:
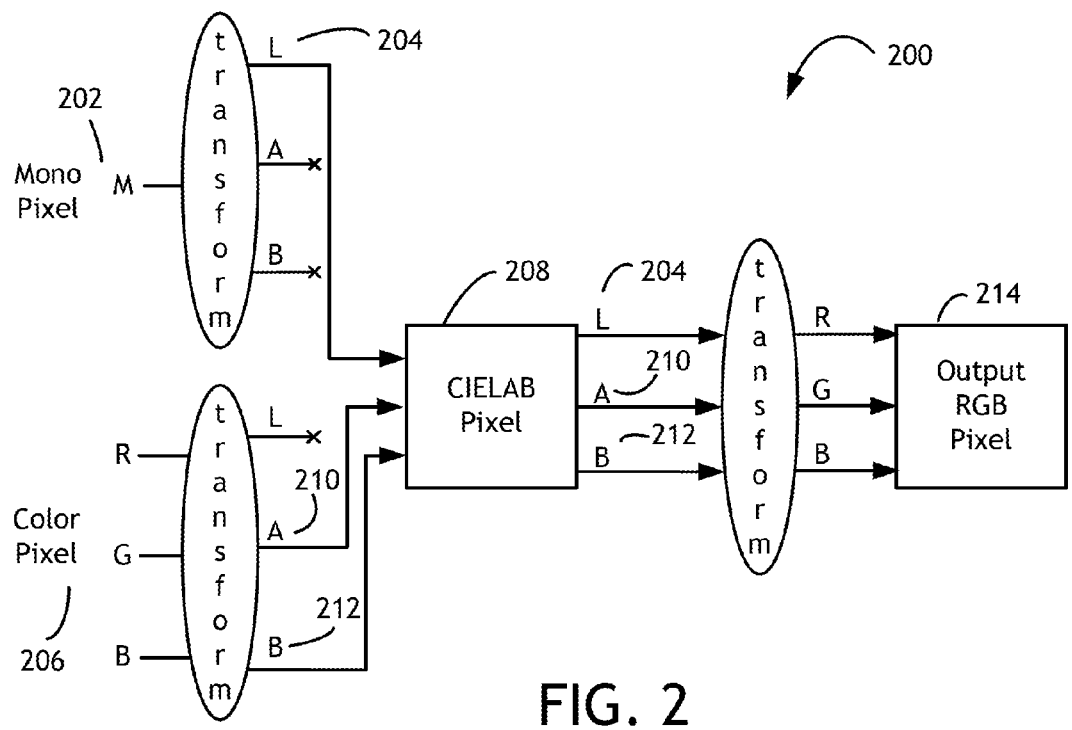
FIG. 2 is an example of the steps of a method for colorizing a monochrome image in the CIELAB ("Commission Internationale de l'Eclairage Lightness Alpha Beta") color domain.

One example 200 of the operation of the method 100 shown in FIG. 1 is shown in FIG. 2 of the present disclosure. In FIG. 2, a monochrome pixel 202 from the monochrome image is transformed to the CIELAB color space. Specifically, a lightness channel 204 of the monochrome pixel 202 is transformed to the CIELAB color space using matrices and equations known in the art. Similarly, a color pixel 206 from the color sample corresponding to the monochrome image is transformed from the RGB color space to the CIELAB color using matrices and equations known in the art.

Once the monochrome pixel 202 and the color pixel 206 are both in the CIELAB color domain 208, the next step of the method is to map the transformed color sample on to the transformed monochrome image and merge the transformed color sample with a lightness channel of the transformed monochrome image. The step of merging the transformed color sample with a lightness channel of the transformed monochrome image step may involve merging an alpha channel 210 and a beta channel 212 of the transformed color sample with a lightness channel 204 of the transformed monochrome image. The final step includes transforming the image to an RGB color space so the final output is an RGB pixel 214.

Figure 3:
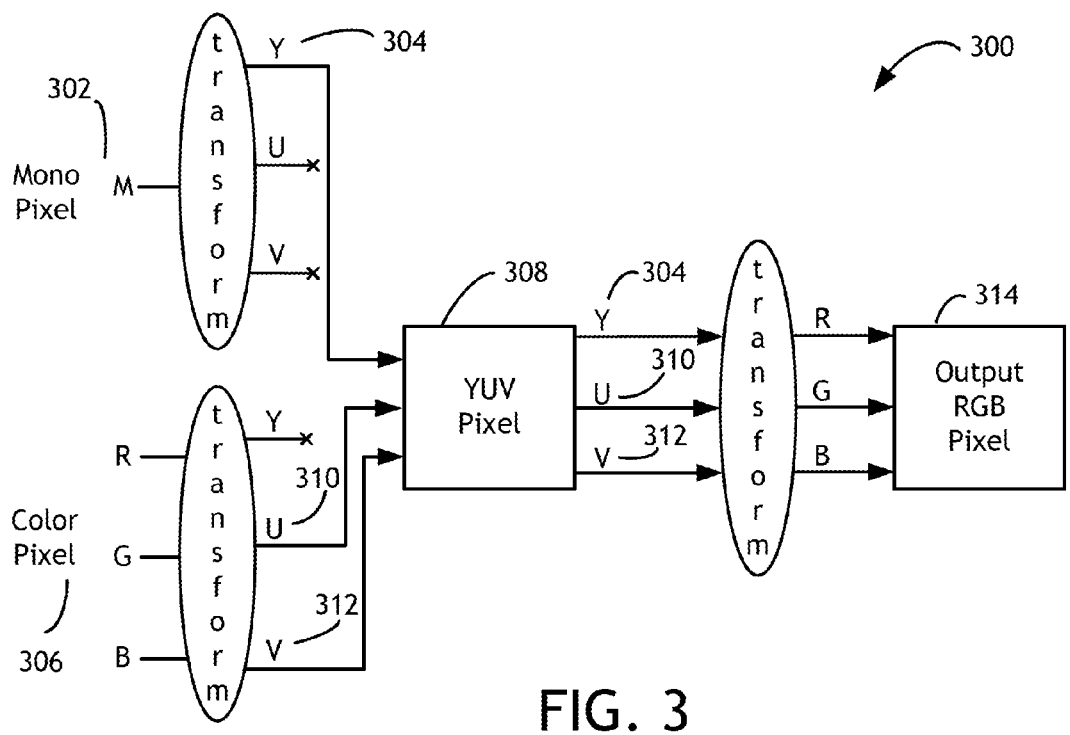
FIG. 3 is an example of the steps of a method for colorizing a monochrome image in the YUV ("Luminance-Bandwidth-Chrominance Y-Signal U-Signal V-Signal") color domain.

An additional example 300 of an implementation of the method 100 shown in FIG. 1 is provided in FIG. 3. In the example, a monochrome pixel 302 from the monochrome image is transformed to the YUV color space. Specifically, the monochrome pixel 302 and the color pixel 306 are transformed to the YUV color space using matrices and equations known in the art. Once the monochrome pixel 302 and the color pixel 306 are both in the YUV color domain 308, the next step of the method is to map the transformed color sample on to the transformed monochrome image and merge the transformed color sample with a lightness channel of the transformed monochrome image. The step of merging the transformed color sample with a lightness channel of the transformed monochrome image involves merging a U chrominance component 310 and a V chrominance component 312 of the transformed color sample with a lightness channel 304 of the transformed monochrome image. The final step includes transforming the final YUV image to an RGB color space so the final output is an RGB pixel 314.

Figure 4:
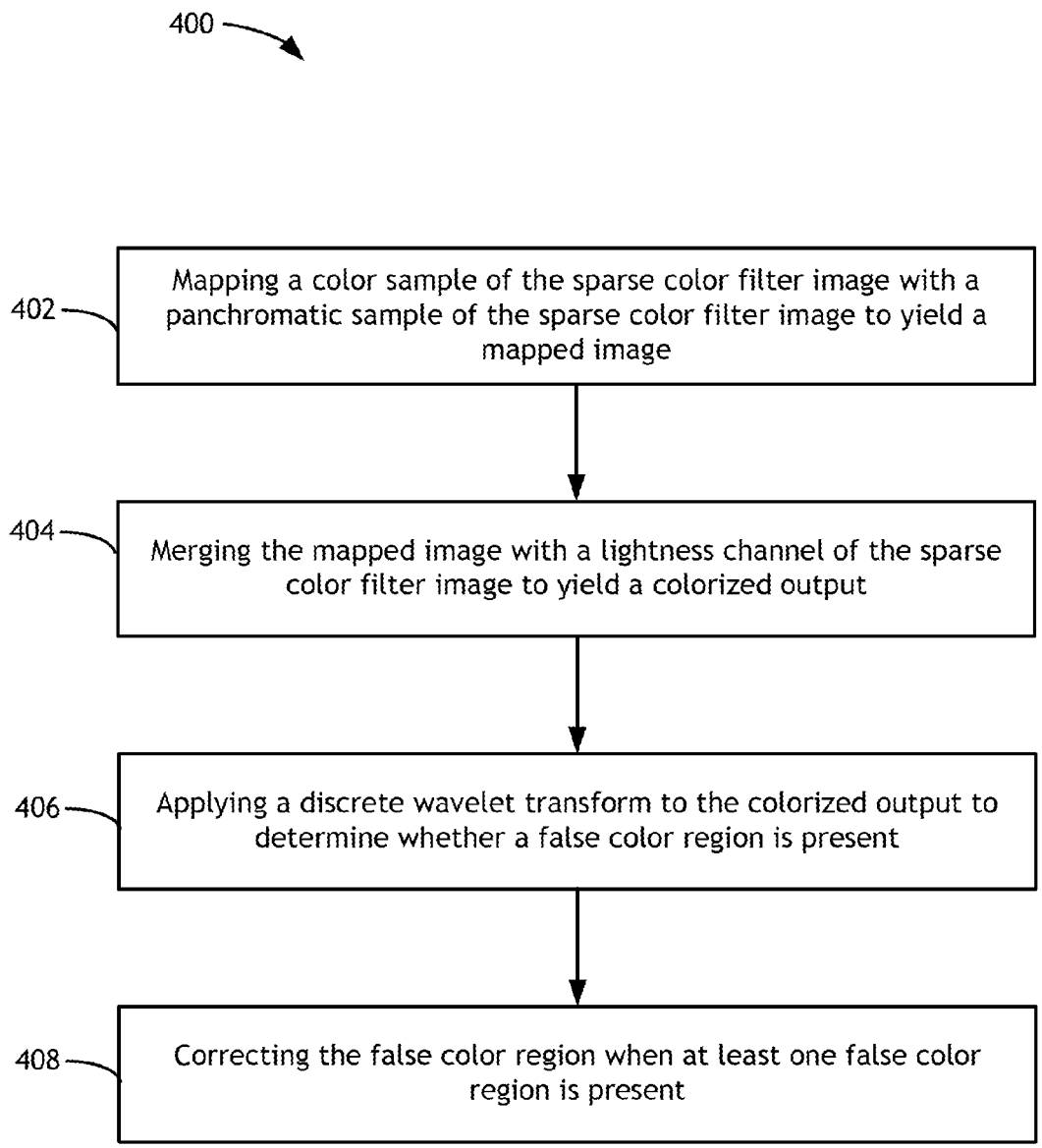
FIG. 4 is a flow diagram of a method for colorizing a sparse color filter image.

The present disclosure is also directed to a method 400 for colorizing a sparse color filter image as shown in FIG. 4. For instance, the sparse color filter image may be derived from a sparse color filter including a four pixel by four pixel filter containing four types of color sensors, red, green, blue, and panchromatic (white). The panchromatic sensors sense all visible light energy as well as near infrared light energy. The panchromatic sensors provide illumination values for the image, and are computed as the monochrome pixels. The other three channels are used as sparse color samples. In a sparse color filter camera, the filters may be tiled to produce a network of sensors. The method 400 may treat each tile as a single color sample using the red, green, and blue sensor data. The panchromatic pixels of the image are colored based on the computed RGB color space data of the tile, and the interpolation of color data from neighboring tiles. The computed color may then be merged with the panchromatic value to produce a colorized output.

In one embodiment, the method 400 shown in FIG. 4 may include the step of mapping a color sample of the sparse color filter image with a panchromatic sample of the sparse color filter image to yield a mapped image 402. The method 400 also includes the step of merging the mapped image with a lightness channel of the sparse color filter image to yield a colorized output 404. A further step of the method 400 involves applying a discrete wavelet transform to the colorized output to determine whether a false color region is present 406. The method also includes the step of correcting the false color region when at least one false color region is present 408.

The step of applying a discrete wavelet transform to the colorized output to identify a false color region 406 of the method 400 shown in FIG. 4, may involve measuring a frequency of a sample of the colorized output. If the frequency is above a predetermined threshold, the sample of the colorized output will be labeled as a false color region. The false color region will need to be corrected in the next step 408 of the method 400.

The step of correcting the false color region when at least one false color region is present 408 of the method 400 shown in FIG. 4 may include measuring the frequency of a sample of a neighboring region of the false color region. If the frequency of the neighboring region is below a predetermined threshold, the neighboring region will be labeled as a true color region. Once a true color region has been found, a colored pixel of the true color region can be merged with a lightness channel of the sparse color filter image to result in a corrected image.

The present disclosure is also directed to a system 500 for colorizing a monochrome image as shown in FIG. 5. The system 500 may include a processor 502 in communication with a memory 504. The system 500 may also include a computer executable program code 506 stored on the memory 504. The computer executable program code 506 may be configured to execute on the processor 502. The computer executable program code 506 transforms the monochrome image and a color sample corresponding to the monochrome image to a luminance color domain and maps the transformed color sample on to the transformed monochrome image. The computer executable program code 506 also merges the transformed color sample with a lightness channel of the transformed monochrome image to yield a final image. The computer executable program code 506 also transforms the final image to an RGB color space.

The processor 502 of the system 500 shown in FIG. 5 may include any suitable computer processor capable of storing computer code that, when executed by processor 502, causes processor 502 to perform a method for colorizing a monochrome image.

The memory 504 of the system 500 shown in FIG. 5 may include a storage memory configured to store the computer executable program code 506 as well as other data. The memory 504 may include any system and/or device capable of storing data.

The system 500 shown in FIG. 5 may also include a sensor in one embodiment. The sensor may be configured for taking the monochrome image, the color sample, or both. The sensor may be in communication with the processor 502. The sensor may include a single camera, a plurality of cameras, a video camera, a sparse color filter camera, a magnetic resonance imaging sensor, a radar sensor, or a sonar sensor, or any other imaging system known in the art.

The color sample corresponding to the monochrome image of the system 500 of claim 5 may be taken by the sensor, or may be derived from an existing database. For example, the color sample may be taken from a database of existing imagery, a mapping database, a satellite image, a manually input image; a synthetic environment image, or a virtual environment image.

The system 500 shown in FIG. 5 may also include a display. The display may be in communication with the processor 502 and configured for displaying the colorized image.

The systems and methods of the present disclosure may be implemented in a scalable approach. The scalable approach may be useful in systems employing multiple microprocessors and/or hardware accelerators for high performance and low power implementations. In one embodiment, it may be possible to use the system and methods to tile images across multiple microprocessors for a spatial parallel processing implementation. The use of multiple microprocessors in a parallel processing implementation may provide performance improvements. For example, the use of hardware accelerators for the color space transformations may help to reduce the time required to perform the method and also improve computing performance and power consumption rates.

The systems and methods of the present disclosure may be applied to other monochrome and color representations and are not limited to the CIELAB, YUV, and RGB representations. One skilled in the art can apply the concepts of this disclosure using color models such as CIE (International Commission on Illumination), RGB, luminance plus chrominance, hue and saturation, and CMYK (cyan, magenta, yellow, and key) color models.

It is understood that the present disclosure is not limited to any underlying implementing technology. The present disclosure may be implemented utilizing any combination of software and hardware technology. The present disclosure may be implemented using a variety of technologies without departing from the scope and spirit of the disclosure or without sacrificing all of its material advantages.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for colorizing a monochrome image, comprising:
    transforming the monochrome image to a luminance color domain;
    transforming a color sample corresponding to the monochrome image to the luminance color domain;
    mapping the transformed color sample on to the transformed monochrome image;
    merging the transformed color sample with a lightness channel of the transformed monochrome image to yield a final image; and
    transforming the final image to a color space.

2. The method of claim 1, wherein the luminance color domain includes a CIELAB ("Commission Internationale de l'Eclairage Lightness Alpha Beta") color space domain.

3. The method of claim 2, wherein the merging the transformed color sample with a lightness channel of the transformed monochrome image to yield a final image includes merging an alpha channel and a beta channel of the transformed color sample with a lightness channel of the transformed monochrome image.

4. The method of claim 1, wherein the luminance color domain includes a YUV ("Luminance-Bandwidth-Chrominance Y-Signal U-Signal V-Signal") color space domain.

5. The method of claim 4, wherein the merging the transformed color sample with a lightness channel of the transformed monochrome image to yield a final image includes merging a U-signal chrominance component and a V-signal chrominance component of the transformed color sample with a lightness channel of the transformed monochrome image.

6. The method of claim 1, wherein the color sample corresponding to the monochrome image includes a color sample from at least one of: a database of existing imagery, a mapping database, a satellite image, a manually input image, a synthetic environment image, or a virtual environment image.

7. The method of claim 1, wherein the color sample corresponding to the monochrome image includes a color sample of color pixels representing a scaled down version of the full scale monochrome image.

8. The method of claim 1, wherein the mapping the transformed color sample on to the transformed monochrome image includes mapping the transformed color sample using at least one of: a nearest neighbor technique or an interpolation technique based on a neighboring sample.

9. The method of claim 1, wherein the mapping the transformed color sample on to the transformed monochrome image includes mapping the transformed color sample using the equation:

$$M_{x,y}^{RGB} = C_{\left[x\frac{C_w}{M_w}\right],\left[y\frac{C_h}{M_h}\right]}$$

where C represents a pixel from the transformed color sample, M represents the transformed monochrome image, $C_w$ is a width of the transformed color sample, $M_w$ is a width of the transformed monochrome image, $C_h$ is a height of the transformed color sample, and $M_h$ is a height of the transformed monochrome image.

10. The method of claim 1, wherein the monochrome image is produced from at least one of: a single camera, a plurality of cameras, a video camera, a sparse color filter camera, a magnetic resonance imaging system, a radar imaging system, and a sonar imaging system.

11. The method of claim 1, wherein the mapping the transformed color sample on to the transformed monochrome image includes:
    detecting a value of a pixel of the transformed color sample;
    comparing the value of the pixel to a predetermined threshold;
    mapping the pixel on to the transformed monochrome image when the pixel is at least equal to the predetermined threshold.

12. A system for colorizing a monochrome image, the system comprising:
    a processor;
    a memory, the memory in communication with the processor;
    a computer executable program code stored on the memory, the computer executable program code configured to execute on the processor,
    wherein the computer executable program code transforms the monochrome image and a color sample corresponding to the monochrome image to a luminance color domain and maps the transformed color sample on to the transformed monochrome image and merges the transformed color sample with a lightness channel of the transformed monochrome image to yield a final image, and the computer executable program code transforms the final image to a color space.

13. The system of claim 12, further comprising:
a sensor, the sensor configured for taking the monochrome image, the sensor in communication with the processor.

14. The system of claim 12, wherein the sensor includes at least one of: a single camera, a plurality of cameras, a sparse color filter camera, a magnetic resonance imaging sensor, a radar sensor, or a sonar sensor.

15. The system of claim 12, further comprising:
a display, the display in communication with the processor, the display configured for displaying the colorized image.

16. The system of claim 12, wherein the luminance color domain includes a YUV color space domain or a CIELAB color space domain.

17. The system of claim 12, wherein the color sample corresponding to the monochrome image includes a color sample taken from at least one of: a database of existing imagery, a mapping database, a satellite image, a manually input image, a synthetic environment image, or a virtual environment image.

18. A method for colorizing a sparse color filter image, the method comprising:
mapping a color sample of the sparse color filter image with a panchromatic sample of the sparse color filter image to yield a mapped image;
merging the mapped image with a lightness channel of the sparse color filter image to yield a colorized output;
applying a discrete wavelet transform to the colorized output to determine whether a false color region is present;
correcting the false color region when at least one false color region is present.

19. The method of claim 18, wherein the applying a discrete wavelet transform to the colorized output to identify a false color region includes:
measuring a frequency of a sample of the colorized output; and
labeling the sample of the colorized output as a false color region when the frequency is above a predetermined threshold.

20. The method of claim 18, wherein the correcting the false color region when at least one false color region is present includes:
measuring the frequency of a sample of a neighboring region of the false color region;
labeling the sample of the neighboring region as a true color region when the frequency is below a predetermined threshold;
merging a colored pixel of the true color region with a lightness channel of the sparse color filter image.

* * * * *